(12) United States Patent
Woo et al.

(10) Patent No.: US 8,619,160 B2
(45) Date of Patent: Dec. 31, 2013

(54) USER-RESPONSIVE, ENHANCED-IMAGE GENERATION METHOD AND SYSTEM

(75) Inventors: Woon Tack Woo, Gwangju (KR); Se Jin Oh, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 327 days.

(21) Appl. No.: 12/867,412

(22) PCT Filed: Jan. 8, 2009

(86) PCT No.: PCT/KR2009/000099
§ 371 (c)(1),
(2), (4) Date: Aug. 17, 2010

(87) PCT Pub. No.: WO2009/102116
PCT Pub. Date: Aug. 20, 2009

(65) Prior Publication Data
US 2010/0321540 A1 Dec. 23, 2010

(30) Foreign Application Priority Data

Feb. 12, 2008 (KR) .......................... 10-2008-0012711

(51) Int. Cl.
*H04N 5/262* (2006.01)

(52) U.S. Cl.
USPC .................... 348/239; 348/222.1; 348/333.01

(58) Field of Classification Search
USPC .................... 348/222.1, 333.01, 239
See application file for complete search history.

(56) References Cited

U.S. PATENT DOCUMENTS

| 7,084,876 B1 | 8/2006 | Fogel et al. |
| 2002/0060648 A1* | 5/2002 | Matsui et al. .................. 345/8 |
| 2008/0284864 A1* | 11/2008 | Kotake et al. .............. 348/222.1 |
| 2009/0051682 A1* | 2/2009 | Lonsing ....................... 345/419 |
| 2009/0066690 A1* | 3/2009 | Harrison ....................... 345/419 |

FOREIGN PATENT DOCUMENTS

| JP | 11-110579 A | 4/1999 |
| JP | 2006-031665 A | 2/2006 |
| JP | 2006-293604 A | 10/2006 |
| KR | 1020050078136 A | 8/2005 |
| KR | 1020060021001 A | 3/2006 |

OTHER PUBLICATIONS

International Search Report for PCT/KR2009/000099 filed on Jan. 8, 2009.
Written Opinion of the International Searching Authority for PCT/KR2009/000099 filed on Jan. 8, 2009.

* cited by examiner

Primary Examiner — Gevell Selby

(57) ABSTRACT

The present invention concerns an enhanced-image generation system and method which responds adaptively to changes in conditions in real space or virtual space. The enhanced-image generation system according to the present invention comprises: a conditions-judging unit for judging conditions on the basis of conditions data associated with actual objects and conditions data associated with virtual objects; an operational-parameter generating unit for generating operational parameters for a responsive agent in accordance with the judged conditions; and an enhanced-image generating unit for generating an enhanced image through the use of agent operational parameters and an image relating to an actual object. The present invention makes it possible to generate enhanced images which respond actively to changes in conditions and which are relatively realistic, and also makes it possible to generate enhanced images which are matched to the user and which are made to reflect the user's individual preferences and experiences.

16 Claims, 3 Drawing Sheets

USER-RESPONSIVE, ENHANCED-IMAGE GENERATION METHOD AND SYSTEM

TECHNICAL FIELD

The present invention relates to a method and system for generating user-responsive augmented images. More particularly, the present invention relates to a method and system for generating augmented images capable for being used for an augmented reality technology based entertainment system, education system, or the like, that can interact with virtual agents in a physical space using PDAs, UMPCs, cellular phones, or the like, that are a mobile device equipped with a camera.

BACKGROUND ART

Augmented reality technology augments physical objects with computer-generated content in a real world. The technology superimposes the content over real objects that physically exist in real world. The augmented image, which is reproduced based on the augmented reality technology, is an image reproduced in a form in which the real objects and the virtual objects are synthesized on a display screen.

The augmented reality technology has been developed to supplement or improve the real images by using the virtual images and has been developed in a form of a system attaching a computer device to a body of a human being or a system mountable on a portable mobile device.

The augmented reality enables a user to feel more presence than the existing virtual reality in that he/she can see the virtual environment or the virtual information while seeing the real environment. Further, the augmented reality is more attractive than other types of metabus in that it can induce immersion. In particular, since the augmented reality is more practical in terms of information transmission, it has been used for telemedicine diagnosis, education contents, or the like.

However, since the virtual objects implemented by the existing augmented reality perform only limited operations under any given environment, there is a problem in that they do not sufficiently reflect the change in context of a real space or the change in context of a virtual space.

DISCLOSURE

Technical Problem

The present invention has been made in an effort to provide a method for generating an augmented image capable of actively responding the change in the real context and the virtual context and improving reality and a sense of unification by applying a virtual agent, that appraises the contextual information of real and virtual objects and shows response to the appraisals, into augmented reality.

In addition, the present invention has been made in an effort to provide a system for generating an augmented image.

Technical Solution

An exemplary embodiment of the present invention provides a system for generating an augmented image, including: an image acquisition unit that acquires images for real objects existing in a real space through a camera; a context appraisal unit that receives context information related to real and virtual objects and appraises the information according to appraisal algorithms in an autonomous way; a response parameter generation unit that make parameters to generate an agent's response related to the operation of the virtual object, that is, the responsive agent existing in the virtual space and responding to the appraised context; and an augmented image generation unit that generates an augmented image by combining an image acquired from the image acquisition unit and the agent's response generated from the response parameter generation unit.

Another exemplary embodiment of the present invention provides a method for generating an augmented image, including: acquiring images for real objects existing in a real space through a camera; receiving context information related to both real and virtual objects existing in an virtual space and appraising the information according to a pre-defined algorithm; generating an agent's responses related to the operation of the virtual object, that is, the responsive agent existing in the virtual space and responding to the appraised context; and generating an augmented image by using an image acquired from step a) and the agent response parameter generated from step c).

Yet another exemplary embodiment of the present invention provides a computer readable recording medium recorded with program for performing the method for generating an augmented image on a computer.

Advantageous Effects

According to the exemplary embodiments of the present invention, it can generate the augmented image capable of improving the reality and the immersion and sense of unification of the user as compared to the related art by introducing a directly interacting agent into augmented reality, based on the context information of the real and the virtual objects at the time of generating the augmented image. In addition, according to the exemplary embodiments of the present invention, it can control the operation of the responsive agent in consideration of the user profile information related to the user history, thereby making it possible to generate the augmented image reflecting the preference and experience of the user.

BEST MODE

Figure 1:
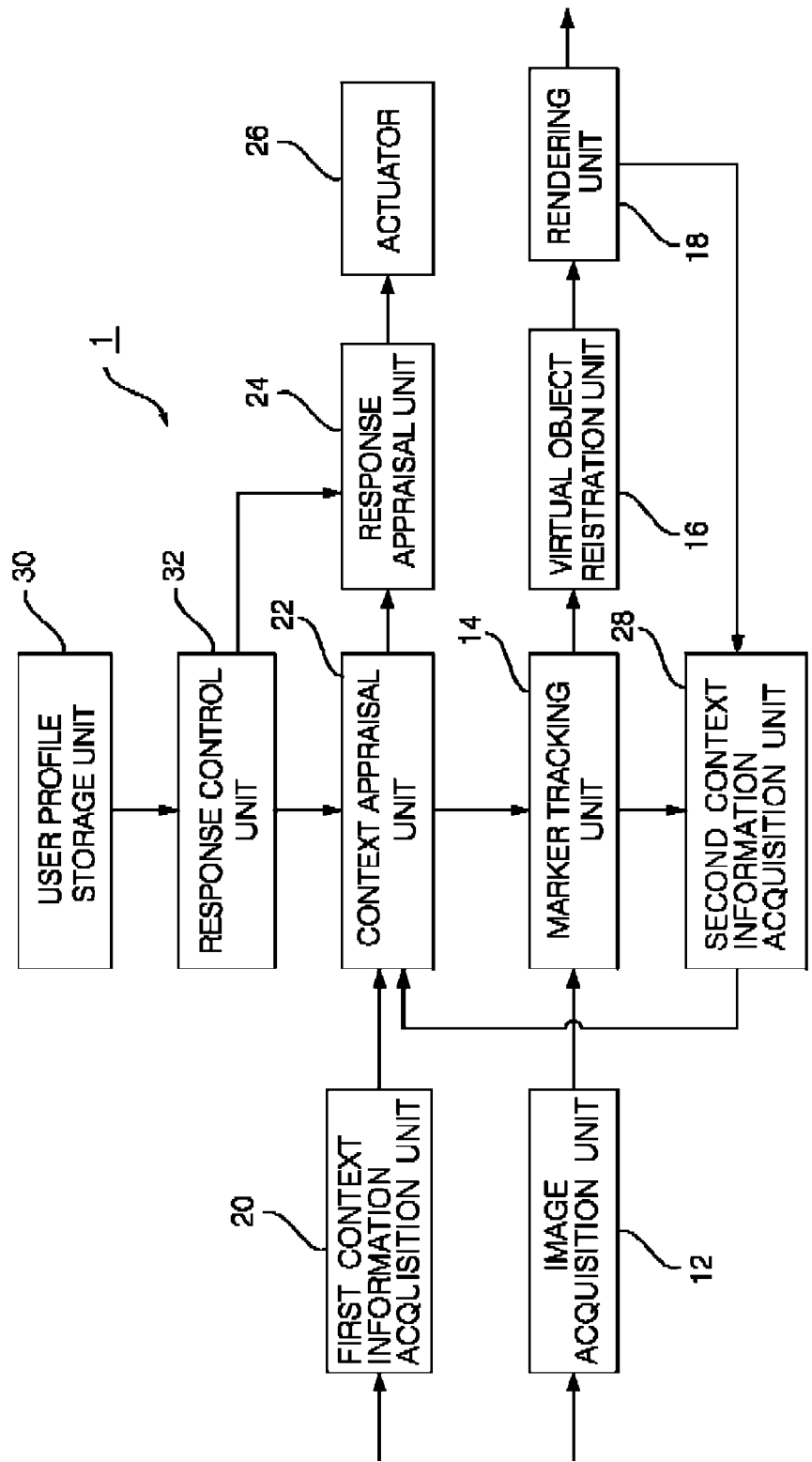
FIG. 1 is a block diagram showing a system for generating a user-responsive augmented image according to an exemplary embodiment of the present invention.

A system for generating an augmented image according to an exemplary embodiments of the present invention includes: an image acquisition unit that acquires images for real objects existing in a real space through a camera; a context appraisal unit that receives context information related to real and virtual objects existing in an virtual space and appraises context according to appraisal algorithms; an response parameter generation unit that determine responses to control the operation of the virtual object, that is, the responsive agent existing in the virtual space and responding to the appraised context; and an augmented image generation unit that creates an augmented image using an image acquired from the image acquisition unit and the agent response generated from the response parameter generation unit.

The system for generating an augmented image may further includes a user profile storage unit that stores user profile information related to the preference or experience of a user, and a response control unit that transfers first control variables for controlling context appraisal according to the stored user profile information to the context appraisal unit or transfers second control variables for controlling the generation of response parameters to the response parameter generation unit according to the stored user profile information.

The context appraisal unit may infers the characteristic information of the user by using the context information and user profile information and appraises the context according to the predefined algorithm by using the context information and the inferred characteristic information of the user.

The system for generating an augmented image may further includes a marker tracking unit that recognizes markers attached to real objects and tracks those movement. Based on the identification of recognized real object, it determines associated virtual objects to the recognized object and the information related to the position of the virtual objects. The context appraisal unit appraises context by further considering the identification information and the positional information. The augmented image generation unit includes a virtual object registration unit that corrects the positions of the virtual objects using the identification information and the positional information to generate the registration of virtual object; and a rendering unit that generates the augmented image by combining images acquired from the image acquisition unit and the agent response generated from the response parameter generation unit.

The marker tracking unit may recognize and track markers from at least one of a user marker image, a virtual object marker image, and a virtual agent marker image that are included in the image of the real object.

The response parameter generation unit may include a response selection unit that determines the response of the responsive agent according to the appraised context; an actuator that generates the parameters controlling details of responses of responsive agent to the selected response.

The system for generating an augmented image may further includes a sound generation unit that generates parameters for the agent's sound-based responses, that is, the sound generation unit generates a sound effect according to the agent sound parameter in the generated augmented image.

The first context information may includes at least one selected from a group consisting of identification information on the real object, positional information on the real object, and real environmental information.

The second context information may includes at least one selected from a group consisting of identification information on the virtual objects, positional information on the virtual object, information related to the change in context of the virtual object, and virtual environmental information.

A method for generating an augmented image according to an exemplary embodiments of the present invention includes: a) acquiring images for real objects existing in a real space; b) receiving first context information related to real objects and second context information related to virtual objects existing in an virtual space and appraising context according to appraisal algorithms; c) generating an agent's responses related to the operation of the virtual object, that is, the responsive agent existing in the virtual space and responding to the appraised context; and d) generating an augmented image using an image acquired from step a) and the agent response parameter generated from step c).

The appraising of the context at step b) may appraises context by further considering user profile information prestored as history preference or experience of user, or the generating of the agent's response parameter at step c) may generates the object response parameters by further considering the user profile information.

The step b) may further includes inferring the characteristic information of the user by using the first context information and the second context information and the user profile information and the appraising of the context at step b) appraises the context according to a predetermined algorithm by using the input information and the inferred characteristic information of the user.

The method for generating an augmented image may further includes: tracking markers from the images for the acquired real objects; and appraising identification information for identifying virtual objects according to the tracked marker and the positional information related to the position of the virtual objects, wherein step b) appraises context by further considering the identification information and the positional information, and step d) includes: d1) generating virtual object registration information correcting the positions of the virtual objects using the identification information and the positional information; and d2) generating the augmented image by further considering the virtual object registration information.

The tracking marker may tracks markers from at least one of a user marker image, a virtual object marker image, and a virtual agent marker image that are included in the image of the real object.

The step c) may includes: c1) appraising the response of the responsive agent according to the appraised context; and c2) generating the agent response parameters controlling the operation of the responsive agent according to the appraised response.

The step c) may further includes generating an agent sound parameter related to the sound of the virtual object, that is, the responsive agent; and step d) includes generating a sound effect according to the agent sound parameter in the generated augmented image response parameter.

MODE FOR INVENTION

Hereinafter, a system and a method for generating a user-responsive augmented image of the present invention and a recording medium recorded with program performing the method will be described with reference to figures and exemplary embodiments.

FIG. 1 is a block diagram showing a system 1 for generating a user-responsive augmented image according to an exemplary embodiment of the present invention. The system 1 for generating a user-responsive augmented image shown in FIG. 1 includes an image acquisition unit 12, a marker tracking unit 14, a virtual object registration unit 16, a rendering unit 18, a first context information acquisition unit 20, a context appraisal unit 22, a responsive appraisal unit 24, an actuator 26, a second context information acquisition unit 28, a user profile storage unit 30, and a response control unit 32.

The system 1 for generating a user-responsive augmented shown in FIG. 1 is an apparatus that generates a user-responsive augmented image by using a first context information representing an image existing in the real space as well as contexts of real objects and second context information representing contexts of virtual objects existing in an augmented real space. In particular, the system for generating an augmented image shown in FIG. 1 is differentiated from the related art in that it controls the operation of the responsive agent depending on the context in the real space and the virtual space and controls the operation of the responsive agent by using the user profile information stored for each user as a history according to the preference of the user.

The image acquisition unit 12 acquires the images for the real objects existing in the real space. Herein, the real object means recognizable objects existing in the real space. For example, the real object means a user, a background, a marker of a user, a marker of a virtual object, a marker of a virtual agent, etc. An example of the image acquiring unit 12 may include an image photographing apparatus such as a digital camera, a camcorder, or the like.

The marker tracking unit 14 tracks markers from the images for the acquired real objects and appraises the identification information for identifying the virtual objects and the positional information related to the positions of the virtual objects according the tracked marker. The marker to be tracked may include the user marker that can recognize the operation of the user, the marker of the virtual object, the marker of the virtual agent, or the like. The user marker can set, for example, the user's finger as the marker and attach the specific marker to the user's finger.

Herein, the virtual object is a virtual object that does not exist in the real space. The virtual contents existing in the virtual space may include, for example, bird, flower, water, iris, trowel, or the like and the kind thereof is not specifically limited. The marker of the virtual object is a symbol existing in the real space representing the virtual object. The real objects existing in the real space photographed from the image acquiring unit one-to-one corresponds to the virtual objects and the information on the correspondence relationship is previously stored in the object information storage unit (not shown). In addition, the symbol representing the virtual object is separately manufactured and the manufactured symbol may be set as the marker of the virtual object.

Meanwhile, the virtual responsive agent is a responsive virtual object responding to the operation of the user, which is the main characteristic of the present invention. The responsive agent may be included in the virtual object in a broad sense. However, although the interactive virtual object is a passive operational object that shows the uniform response according to the operation of the user without considering the peripheral context information, the responsive agent that is a concept proposed in the present invention is differentiated from the virtual object of the related art in that it is actively operated according to the change in real space and the change in virtual space existing in the augmented reality and is the virtual object showing the personalized response according to the user.

The information on the above-mentioned marker, for example, the information on the marker image, the virtual object information corresponding to the marker, the identification information of the virtual object, or the like, are pre-stored in the object information storage unit (not shown). The marker tracking unit 14 appraises whether there are markers from the image acquired from the image acquiring unit in real time and when there are markers, reads the identification information (ID) of the object information corresponding to the corresponding marker from the object information storage unit.

The tracking of the marker may be sub-divided into processes of recognizing the markers and tracking the recognized marker. The recognition of the marker is performed through a process of appraising whether there are marker images similar to the marker images stored in the object information storage unit among the objects included in the acquired images. Once the marker is recognized, the moving path of the marker can be tracked through the template matching between the image of the current frame and the image of the previous frame. The identification information on the virtual object according to the tracked marker is read from the object information storage unit and is transferred to the context appraisal unit 22, together with the positional information of the marker, the positional information of the virtual object, etc., which can be acquired according to the results of the tracking.

A virtual object registration unit 16 uses the identification information and the positional information to generate the virtual object registration information correcting the positions of the virtual object. In particular, the virtual object registration unit generates the corrected positional information, that is, the virtual object registration information in consideration of the shape of the virtual object according to the identification information and the direction of the image acquiring unit obtained by photographing the virtual object.

The rendering unit 18 generates the augmented image acquired by synthesizing the real image with the virtual object image by using the image information acquired from the image obtaining unit, the identification information of the virtual object, the virtual object registration information, and the agent response parameter.

The first context information acquisition unit 20 uses the sensor that is installed in the inside or outside of the system to context information related to the context of the real object existing in the real space. The first context information acquisition unit may be, for example, a bio signal sensor such as a temperature sensor, a blood pressure sensor, or the like. An example of the context information related to the context may include the identification information, the positional information, the bio signal information, and the real environmental information, or the like that exist in the real space.

A context appraisal unit 22 receives the first context information related to the real object and the second context information related to the virtual object existing in the virtual space and appraises the current text according to the appraisal algorithm. In this configuration, the second context information may include the identification information and the positional information of the virtual object, the information related to the change in context of the virtual object, the virtual environmental information, or the like.

The response appraisal unit 24 appraises the response of the responsive agent according to the results of the context appraisal unit 22, that is, the appraised context. For example, when the user gives food of bird, which is the virtual object, to a bird, which is the responsive agent, the response appraisal unit 24 can appraise that the bird that is the responsive agent shows the pleasant reaction.

As another example, the response appraisal unit 24 can appraise that the response that the bird comfortably eats its own feed shows when the user feeds a bird in the house and appraise that the response that the bird is reluctant to eat its own feed shows when the user feeds a bird at a class hour. It is preferable that the pattern of the response is stored in a domain information storage unit (not shown) in a domain information type. In this case, the context appraisal unit appraises the current context and transfers the appraised results to the response appraisal unit in consideration of the domain information stored in the domain information storage unit. Thereby, the response pattern of the agent may be differently controlled according to the context.

The actuator 26 generates the agent response parameter for controlling the operation of the responsive agent according to the response appraised in the response appraisal unit 24. An example of the agent response parameter may include response parameters for controlling wink of bird, wings of bird, motion of bird, etc., for example, when a bird pleasantly responds.

The second context information acquisition unit 28 uses the virtual sensor to acquire the context information related the context of the virtual context existing in the virtual space. The virtual sensor is not an actual sensor and means a logic processing block that senses the change in virtual space, the change in virtual object, etc. For example, when a flower, which is a virtual object, is in full bloom by enable a user to plant the flower, which is the virtual object, at the specific position and water the flower by using a marker of a water aperture that is the virtual object, the second context information acquisition unit may acquire the change in virtual object as the context information of the virtual object according to each step.

The user profile information 30 stores the user profile information that is a user history related to the preference or experience of the user. An example of the user profile information related to the experience of the user may stores the inexperience of the user related to a history as the user profile information, when the user has an insufficient background information of a history. As an example of the user profile information related to the preference, when the user prefers the specific foods, the profile information on the preference of the corresponding food may be stored in the profile storage unit. In addition, the user profile information may further include information on preference of various multi-modalities (sense of sight, sense of hearing, sense of touch), preference of contents type, etc. The user profile information may be acquired through a pre-test for understanding the characteristics of the user or the profile information may be induced based on the previously stored user profile information (for example, past used history) or the interaction history of the user using the system.

The response control unit 32 transfers a first control variable for controlling the appraisal performed in the context appraisal unit according to the user profile information stored in the user profile storage unit to the context appraisal unit 22 or transfers the second control variable for controlling the response parameter generation to the response appraisal unit 24. For example, when the user having the inexpensive of a history, that is, the insufficient background information thereof reads a book, the response control unit 32 may transfer the control variable for controlling the response that the responsive agent describes the background information may be transferred to the response appraisal unit 24.

In another exemplary embodiment of the present invention, the context appraisal unit may be provided to infer the characteristic information of the user by using the first context information, the second context information, and the user profile information and to appraise the context according to the pre-defined algorithm by using the input first context information and the second context information, and the inferred characteristic information of the user. In this case, the augmented contents can be generated according to the inferred characteristic information of the user without separately including the response control unit generating the first control variable for appraising the context.

The above-mentioned exemplary embodiment described the system for generation an augmented image in which the agent image responding according to the context is augmented. However, the response of the agent is not necessarily limited to the image response but can be made acoustically or tactually. In other words, the multimodal contents can be augmented. To this end, the system of the present invention may further include the sound parameter generation unit that generate the sound parameter generating the agent sound parameter related to the sound of the responsive agent that is a virtual object image and a sound generation unit that generates a sound effect in the generated augmented image according to the agent sound parameter. In this case, the multimodal contents supporting the image and sound can be provided.

Further, the context appraisal unit of the present invention may be provided to appraise the augmented contents type by using the user profile information. For example, in the case of the user having a weak sense of hearing, the image or tactile based augmented contents are provided and in the case of the user having a weak sense of sight, the auditory or tactile based augmented contents is provided, thereby making it possible to appraise the augmented contents.

In addition, the system for generating a user-responsive augmented image according to another exemplary embodiment of the present invention may further include a real service provision unit (not shown) that provides additional services such as effect music, effect image, etc., provided to the user in the real space in which the user exists and a virtual service providing unit (not shown) that provides additional services to the virtual objects or the responsive agent in the virtual space. In addition, the system for generating a user-responsive augmented image further includes a context history storage unit (not shown) that stores information on the results of the above-mentioned context appraisal, the appraised response, the agent response parameter, etc., and may be provided to delete the context history information when a predetermined time elapses.

Figure 2:
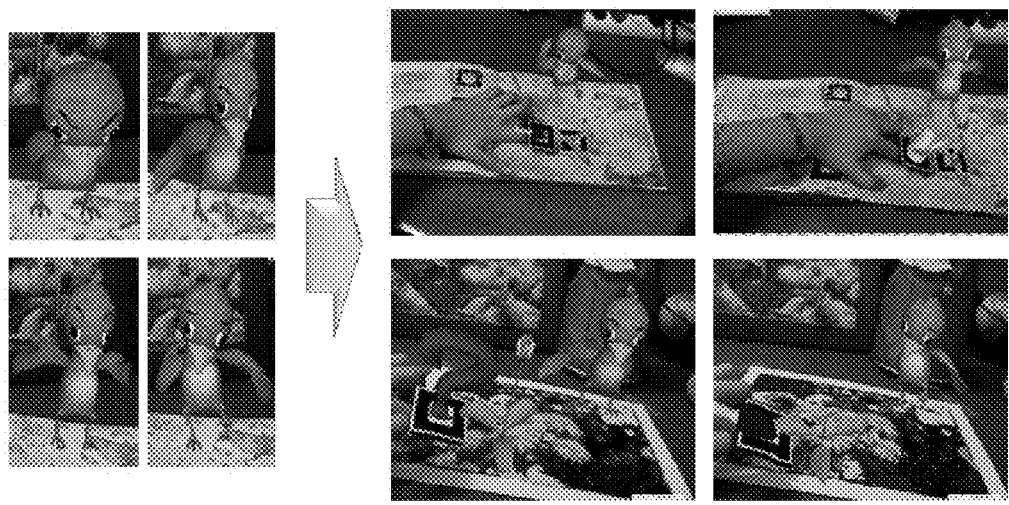
FIG. 2 is a reference diagram showing an example of response of a responsive agent according to context of virtual objects and real objects.

FIG. 2 is a reference diagram showing an example of response of a responsive agent according to circumference of virtual objects and real circumference. The left image of FIG. 2 shows an example of the response of various agents without considering the context and the right image thereof shows an example of the agent response responding according to the context. The right image shows an example of the response of the agent according to each of the case where the user plants sunflower by using the trowel marker, the user water sunflower, sunflower is in full bloom, the user digs a root of sunflower by using the trowel, etc. According to the exemplary embodiment of the present invention, since the response and operation of the responsive agent are determined in consideration of the context of the real object, the context of the virtual object, and the user profile information related to the predetermined preference of the user, as the final products, the pattern of the augmented image is differently shown according to the user.

Figure 3:
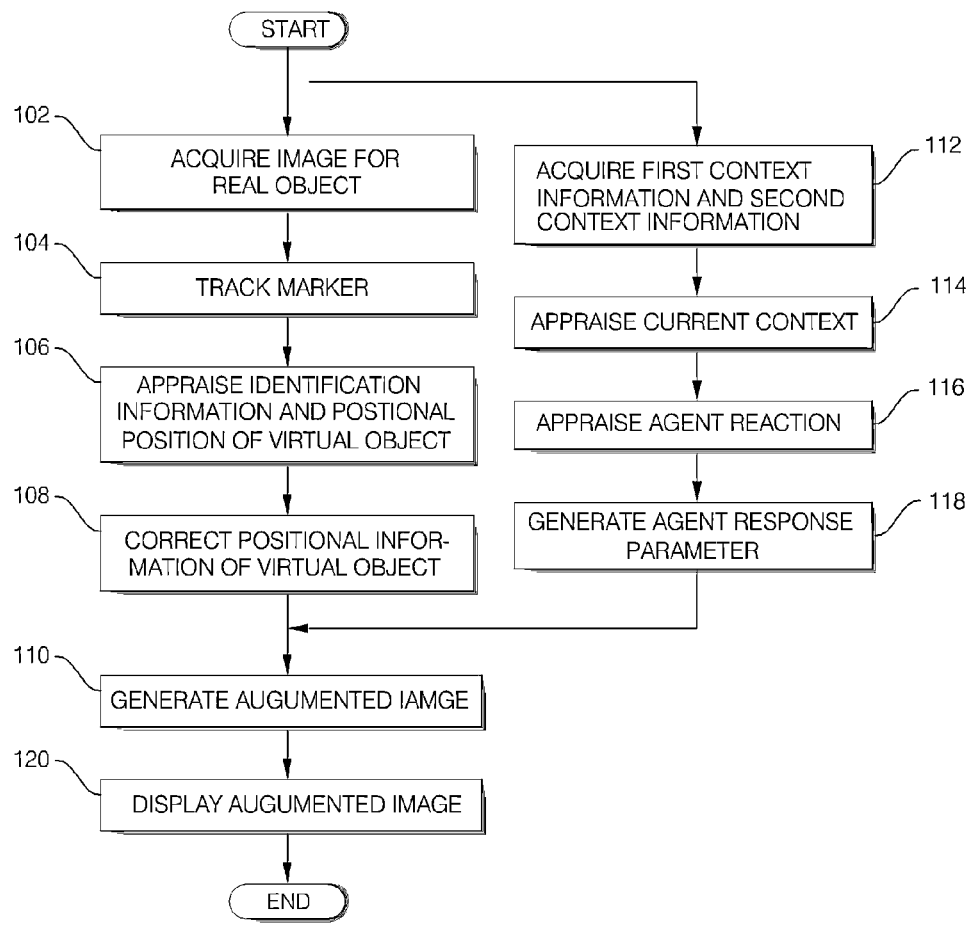
FIG. 3 is a flowchart showing a method for generating a user-responsive augmented image according to an exemplary embodiment of the present invention.

FIG. 3 is a flow chart showing a method for generating a user-responsive augmented image according to an exemplary embodiment of the present invention. The method for generating an augmented image shown in FIG. 3 includes the following steps that are time-serially performed in the system 1 for generating a user-responsive augmented image.

Prior to the driving the system, the method for generating an augmented image shown in FIG. 3 is performed after building the user profile information on the preference and experience of the user as the user profile.

In addition, the step of receiving the user identification information for user identification may be first performed through the input key of the portable terminal.

At step 102, the image acquiring unit 12 acquires the images for the real objects existing in the real space. At step 102, the system for generating an augmented image according to the exemplary embodiment of the present invention may be implemented by a portable terminal including a digital camera and an operation system (OS), for example, a smart phone, a PDA, a UMPC, and the like. The digital camera embedded in the portable terminal can obtain the image for the real object by the image acquiring unit 12.

At step 104, the marker tracking unit 14 recognizes markers from the image obtained at step 102 and tracks the recognized marker. The marker tracking unit 14 receives the images from the image acquiring unit, recognizes the marker through the image recognition algorithm for the marker recognition, and then tracks the recognized marker.

At step 106, the marker tracking unit 14 appraises the identification information and the positional information of the virtual object according to the tracked marker at step 104.

At step 108, the virtual object registration unit 16 generates the virtual object registration information correcting the virtual object and the positional information of the virtual agent by using the identification information and the positional information determined at step 106 and the directional information of the camera. More realistic augmented image can be acquired by correcting the position of the virtual object using the angle of the camera, as compared to considering only the position of the virtual object.

At step 110, the rendering unit 18 generates the augmented image by using the virtual object registration information generated at step 108, the real image obtained at step 102, and the agent response parameter generated at step 118.

At step 112, the first context information acquisition unit 20 acquires the first context information related to the real object related through the positional sensor, the bio signal sensing sensor, etc., and the second context information acquisition unit 28 acquires the virtual object existing in the virtual space and the second context information related to the peripheral context of the virtual object by using the virtual sensor.

At step 114, the context appraise unit 22 receives the first context information and the second context information obtained at step 112 and appraises the current context according to the predetermined algorithm.

At step 116, the response appraisal unit 24 appraises the response of the responsive agent that is the virtual object existing in the virtual space according to the context appraised at step 114.

At step 118, the actuator 26 generates the agent response parameter to implement the response of the responsive agent determined at step 116 as the detailed image on the augmented reality.

At step 120, the display (not shown) provides the augmented image generated at step 110 to the user through the user interface of the monitor, etc. In the case of the portable terminal, the liquid crystal display module of the portable terminal can be used as the display unit.

Meanwhile, the method for generating a user-responsive augmented image may be implemented as a computer-readable code in a computer-readable recording medium. The computer-readable recording medium includes all the types of recording apparatus storing the data readable by the computer system.

An example of the computer-readable recording medium includes a ROM, a RAM, a CD-ROM, a magnetic tape, a floppy disk, an optical data storage unit, or the like, and ones implemented as a type of a carrier wave (for example, transmission through Internet) In addition, the computer-readable recording medium is distributed into the computer system connected to the network and may be stored and executed with the computer-readable code in the distribution manner. The functional program, code, and code segments in order to implement the present invention may be easily inferred by programmers of a person skilled in the art to which the present invention belongs.

The spirit of the present invention has just been exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the appended claims and it should be analyzed that all spirits within a scope equivalent thereto are included in the appended claims of the present invention.

INDUSTRIAL APPLICABILITY

The method and system for generating a user-responsive augmented image according to the exemplary embodiments of the present invention can improve the sense of reality, immersion, coexistence, etc., of the augmented image and can generate the augmented image reflecting the preference and experience of the user. The present invention can be applied to the entertainment related system and the education system of various types driven in a cellular phone, a PDA, an UMPC, or the like.

The invention claimed is:

1. An apparatus for providing an augmented reality, comprising: a camera; and a controller configured to: capture, via the camera, an image of a real space, wherein the real space includes at least one of a real object and a real environment, generate an augmented image including a first virtual object and a second virtual object, wherein the first virtual object is responsive to a user input including a gesture input detected by the camera, obtain first information related to the real space based on the captured image, wherein the first information includes status information of the real environment, and the status information includes place information, the place information indicating whether the real environment is indoor or outdoor, obtain second information related to the generated second virtual object, and determine an action parameter based on the first information and the second information, wherein the first virtual object performs a specific action according to the action parameter.

2. The apparatus of claim 1, wherein the controller manipulates the first virtual object to perform the specific action.

3. The apparatus of claim 1, further comprising a display displaying the augmented image, wherein the controller displays, via the display, the first virtual object performing the specific action.

4. The apparatus of claim 1, wherein the first information further includes at least one of identification information of the real object and position information of the real object.

5. The apparatus of claim 4, wherein the real object includes a marker and the controller obtains the identification information by recognizing the marker from the captured image.

6. The apparatus of claim 1, wherein the second information includes at least one of identification information of the second virtual object and position information of the second virtual object.

7. The apparatus of claim 1, further comprising a memory storing user profile information, wherein the controller determines the action parameter further based on the user profile information.

8. The apparatus of claim 1, wherein the controller generates the augmented image by integrating the first virtual object and the second virtual object into the captured image.

9. A method for providing an augmented reality, comprising: capturing an image of a real space, wherein the real space includes at least one of a real object and a real environment; generating an augmented image including a first virtual object and the second virtual object, wherein the first virtual object is responsive to a user input including a gesture input recognized from the captured image; obtaining first information related to the real space based on the captured image, wherein the first information includes status information of the real environment, and the status information includes place information, the place information indicating whether the real environment is indoor or outdoor; obtaining second information related to the generated second virtual object; and determining an action parameter based on the first information and the second information, wherein the first virtual object performs a specific action according to the action parameter.

10. The method of claim 9, further comprising manipulating the first virtual object to perform the specific action.

11. The method of claim 9, further comprising displaying the augmented image and the first virtual object performing the specific action.

12. The method of claim 9, wherein the first information further includes at least one of identification information of the real object and position information of the real object.

13. The method of claim 12, wherein the real object includes a marker and the controller obtains the identification information by recognizing the marker from the captured image.

14. The method of claim 9, wherein the second information includes at least one of identification information of the second virtual object and position information of the second virtual object.

15. The method of claim 9, further comprising storing user profile information, and wherein the action parameter is determined further based on the user profile information.

16. The method of claim 9, wherein the augmented image is generated by integrating the first virtual object and the second virtual object into the captured image.

* * * * *